Sept. 8, 1931.  A. E. C. THOMAS  1,822,179
AEROPLANE WING CONSTRUCTION
Filed Oct. 15, 1930   2 Sheets-Sheet 1
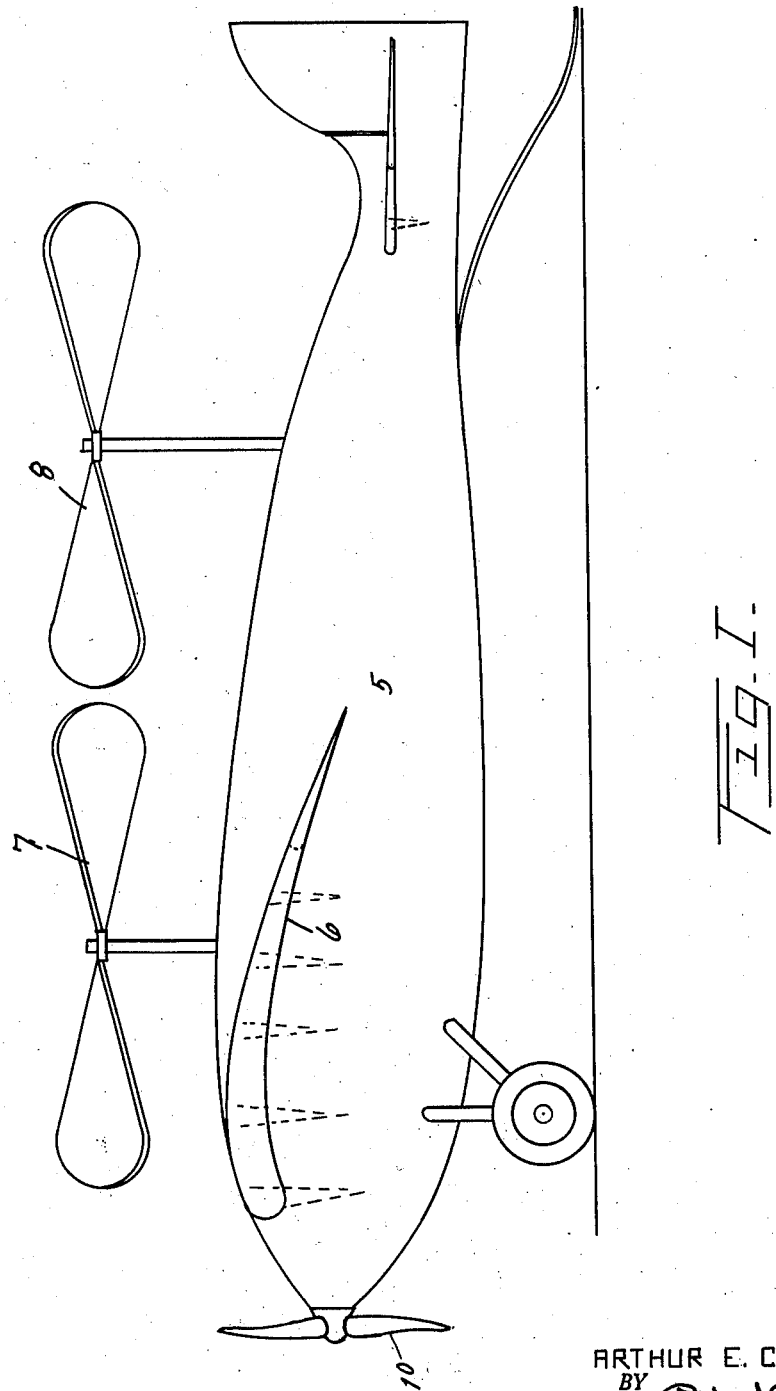
Fig. I.
INVENTOR.
ARTHUR E. C THOMAS
BY
ATTORNEY

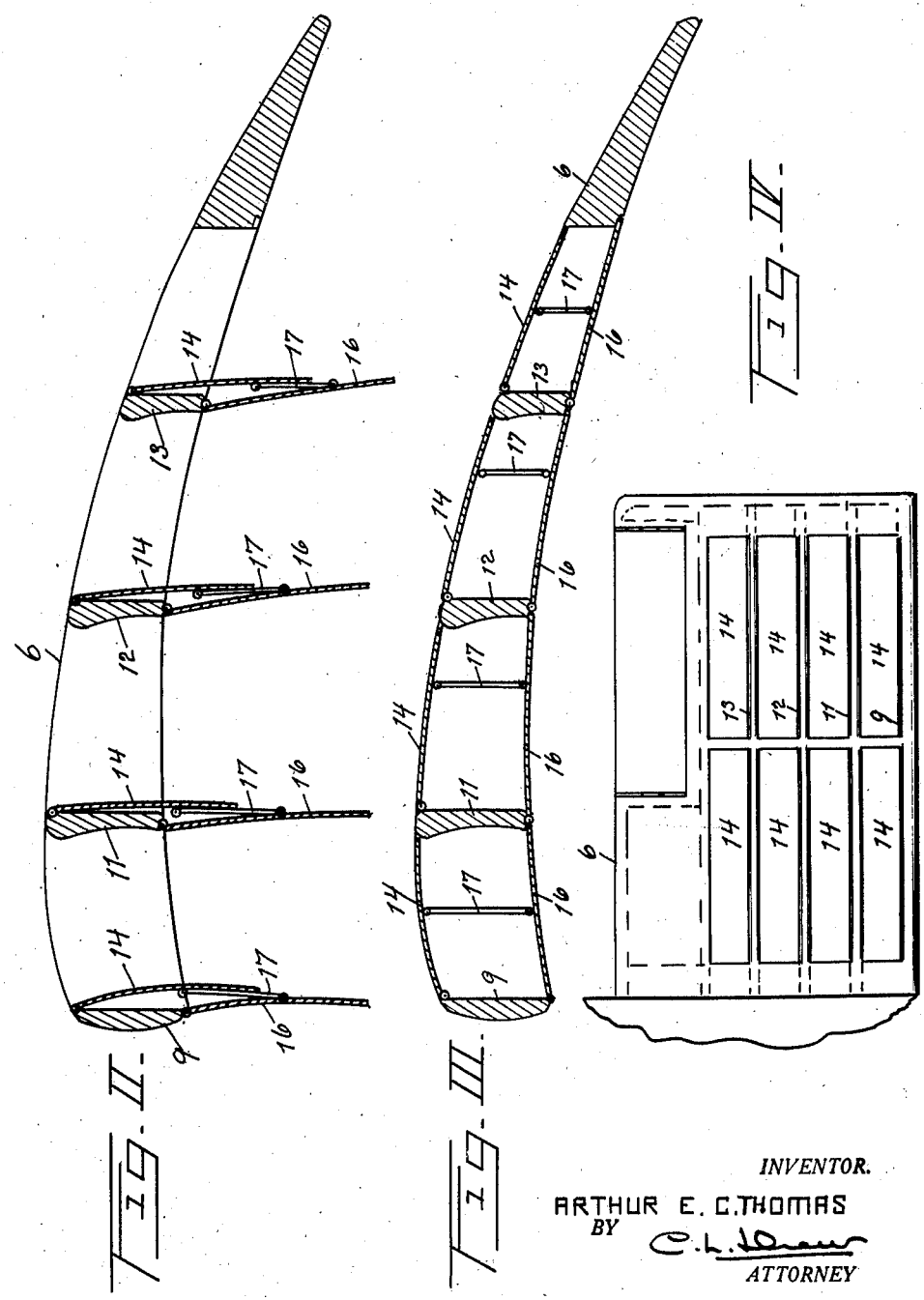

Patented Sept. 8, 1931

1,822,179

UNITED STATES PATENT OFFICE

ARTHUR E. C. THOMAS, OF SAN BRUNO, CALIFORNIA

AEROPLANE WING CONSTRUCTION

Application filed October 15, 1930. Serial No. 488,876.

This invention relates to improvements in aeroplane wings and has particular reference to that type of aeroplane commonly known as a helicopter.

The principal object of this invention is to provide means whereby when the helicoper propellers are in actuation, the down air travel therefrom will not be impeded by contacting the wings, in other words to provide a means whereby the air currents will pass thru the wings during the initial upward movement of the plane and to further provide for the forward travel of the plane upon the usual supporting surfaces of the wing.

A further object is to provide a wing structure which may be utilized with ordinary types of aeroplanes.

A further object is to produce a wing which has the stream line shaped now common in wing construction.

A further object is to provide means wherein the struts of the wings, taken together with the valves, form a stream line structure.

Other objects and advantages will be apparent during the course of the following description.

In the accompanying drawings forming a part of this specification and in which like numerals are employed to designate like parts throughout the same, Figure 1 is a side elevation of an aeroplane construction in accordance with my invention, Figure 2 is an enlarged detail cross-sectional view of my device, showing my valves in open position, Figure 3 is a view similar to Fig. 2, showing the valves in closed position, and Figure 4 is a top plan view of an aeroplane wing having my valves incorporated therein on a reduced scale.

Several helicopters have been constructed which been capable of vertical movement but had to depend upon the helicopter propellers to maintain elevation, due to the fact that the customary wing had to be omitted for the reason that it impeded the down travel of the air from the helicopter propellers, and therefore prevented vertical movement.

Applicant has devised valves which may be incorporated in the customary wing of an aeroplane so that the vertical lift principal of a helicopter may be employed and after sufficient elevation has been reached, forward movement and suspension may be maintained thru the use of the customary laterally extending wing.

In the accompanying drawings wherein for the purpose of illustration is shown a preferred embodiment of my invention, the numeral 5 designates an aeroplane body of any form having the customary propellers 10 for forward movement. A wing is shown at 6 and lifting propellers at 7 and 8. These lifting propellers may be actuated in any approved manner.

Referring now to Figs. 2 and 3, it will be noted that the wing 6 is provided with the customary struts 9, 11, 12 and 13. These struts are spaced one from the other and extend longitudinally of the wing. To each of the struts is pivoted near the upper edge thereof an upper valve 14 and to the lower edge of the struts is pivoted a lower valve 16. These valves are curved so as to conform to the contour of the wing when in closed position, (see Fig. 3). The upper valves 14 are connected to the lower valves 16 by links 17. The result of this construction is that when the plane is at rest on the ground, the weight of the valves 14 and 16 together with their connecting links 17 will result in the valves assuming an open position as indicated in dotted lines in Fig. 1, and as also shown in Fig. 2. When the propellers 7 and 8 are rotated, it will therefore be apparent that the air driven from the propellers adjacent the wings, may pass thru the wings, and due to the curved construction of the struts and valves, a substantially stream line contour will be encountered by the downwardly moving air current with a result that the same will not be impeded, and the aeroplane will move upwardly as a consequence. After a sufficient elevation has been reached, rotation of the propeller 10 will cause the aeroplane to move forwardly and as this takes place, the air moving against the valves 16 will cause them to move to closed position, as shown in Fig. 3. The valve 14 will also move to closed position, at which time, the wing surfaces will to all intent and purposes, correspond to the ordinary wing structure.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A stream line valve structure for aeroplane wings comprising a strut having a curved cross-sectional area, a curved upper valve pivoted to said strut, a curved lower valve pivoted to said strut, a link pivoted to said upper valve and said lower valve, the curved cross-sectional area of the said strut and said valve forming a stream line contour when in open position.

In testimony whereof I affix my signature.

ARTHUR E. C. THOMAS.